United States Patent
Won et al.

(10) Patent No.: US 7,751,364 B2
(45) Date of Patent: Jul. 6, 2010

(54) SYSTEM AND METHOD FOR TRANSMITTING/RECEIVING RESOURCE ALLOCATION INFORMATION IN A COMMUNICATION SYSTEM

(75) Inventors: Jong-Hyun Won, Seoul (KR);
Jae-Hwan Chang, Suwon-si (KR);
Jeong-Hoon Park, Yongin-si (KR);
Kang-Gyu Lee, Yongin-si (KR);
Do-Hyon Yim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 967 days.

(21) Appl. No.: 11/490,327

(22) Filed: Jul. 20, 2006

(65) Prior Publication Data

US 2007/0060146 A1    Mar. 15, 2007

(30) Foreign Application Priority Data

Jul. 20, 2005    (KR) ............... 10-2005-0066071
Sep. 5, 2005    (KR) ............... 10-2005-0082403

(51) Int. Cl.
*H04W 4/00*    (2009.01)
*H04J 1/00*    (2006.01)
*H04B 7/00*    (2006.01)

(52) U.S. Cl. ............... 370/329; 370/348; 455/69; 455/522

(58) Field of Classification Search ............... 370/329, 370/348; 455/68, 69, 522
See application file for complete search history.

(56) References Cited

U.S. PATENT DOCUMENTS

| | | | |
|---|---|---|---|
| 6,631,127 B1 | 10/2003 | Ahmed et al. | |
| 7,400,898 B2 * | 7/2008 | Kang et al. | ............... 455/518 |
| 2002/0001296 A1 | 1/2002 | Lee et al. | |
| 2006/0092960 A1 * | 5/2006 | Lee et al. | ............... 370/412 |
| 2006/0101168 A1 * | 5/2006 | Roh et al. | ............... 710/33 |
| 2006/0123324 A1 * | 6/2006 | Cudak et al. | ............... 714/776 |

(Continued)

FOREIGN PATENT DOCUMENTS

EP    1 207 647 A1    5/2002

(Continued)

OTHER PUBLICATIONS

IEEE Standards Board, "IEEE Standard for Local and Metropolitan Area Networks (802.16e)," Feb. 26, 2006, IEEE, IEEE Std 802.16e-2005, p. 82-268,317-651.*

(Continued)

*Primary Examiner*—Dang T Ton
*Assistant Examiner*—Ryan C. Kavleski
(74) *Attorney, Agent, or Firm*—The Farrell Law Firm, LLP

(57) ABSTRACT

A system is provided for transmitting/receiving downlink resource allocation information in a communication system. In the system, a base station generates first information including downlink resource allocation information necessary for supporting a first mode supported by the base station, generates second information including length information of the first information, and transmits the first information and the second information. A mobile station notifies the base station of a second mode supported by the mobile station, receives, after the notification, the first information and the second information from the base station, and skips without decoding as much downlink resource allocation information as a length corresponding to the length information without decoding, if the first mode is different from the second mode.

4 Claims, 3 Drawing Sheets

U.S. PATENT DOCUMENTS

| | | | |
|---|---|---|---|
| 2006/0153112 A1* | 7/2006 | Lim et al. | 370/310 |
| 2006/0184854 A1* | 8/2006 | Ihm et al. | 714/749 |
| 2006/0195767 A1* | 8/2006 | Ihm et al. | 714/776 |
| 2007/0189205 A1* | 8/2007 | Terry et al. | 370/328 |

FOREIGN PATENT DOCUMENTS

| | | |
|---|---|---|
| EP | 1 389 848 B1 | 12/2006 |
| WO | WO 98/52326 | 11/1998 |

OTHER PUBLICATIONS

IEEE Standard for Local and metropolitan area networks; "Part 16: Air Interface for Fixed and Mobile Broadband Wireless Access Systems"; IEEE P802.16e/D7, Apr. 2005.

IEEE Standard for Local and metropolitan area networks; "Part 16: Air Interface for Fixed and Mobile Broadband Wireless Access Systems"; IEEE P802.16e/D8, May 2005.

IEEE Standard for Local and metropolitan area networks; "Part 16: Air Interface for Fixed and Mobile Broadband Wireless Access Systems"; IEEE P802.16e/D9, Jun. 2005.

IEEE Standard for Local and metropolitan area networks; "Part 16: Air Interface for Fixed and Mobile Broadband Wireless Access Systems"; IEEE P802.16e/D10, Aug. 2005.

IEEE Standard for Local and metropolitan area networks; "Part 16: Air Interface for Fixed and Mobile Broadband Wireless Access Systems"; IEEE P802.16e/D11, Sep. 2005.

* cited by examiner

SYSTEM AND METHOD FOR TRANSMITTING/RECEIVING RESOURCE ALLOCATION INFORMATION IN A COMMUNICATION SYSTEM

PRIORITY

This application claims the benefit under 35 U.S.C. §119 (a) of applications entitled "System and Method for Transmitting/Receiving Resource Allocation Information in a Communication System" filed in the Korean Intellectual Property Office on Jul. 20, 2005 and assigned Serial No. 2005-66071, and on Sep. 5, 2005 and assigned Serial No. 2005-82403 the entire contents of which are hereby incorporated by reference.

BACKGROUND OF THE INVENTION

1. Field of the Invention

The present invention relates generally to a communication system, and in particular, to a system and method for transmitting/receiving resource allocation information in a communication system.

2. Description of the Related Art

In the next generation communication system, active research is being conducted to provide high-speed services having various qualities-of-service (QoS). Particularly, in the next generation communication system, active research is being carried out to support high-speed service so as to guarantee mobility and QoS for a Broadband Wireless Access (BWA) communication system such as a Local Area Network (LAN) system and a Metropolitan Area Network (MAN) system. An Institute of Electrical and Electronics Engineers (IEEE) 802.16a/d standard based communication system and an IEEE 802.16e standard based communication system are the typical BWA communication systems.

A description will now be made of an operation of transmitting/receiving resource allocation information, for example, MAP Information Element (IE), in the IEEE 802.16e communication system.

The IEEE 802.16e communication system has a frame structure, so that a base station (BS) efficiently allocates resources of each frame to mobile stations (MSs) and transmits the resource allocation information to the MSs through a MAP message. Herein, a MAP message for transmitting downlink (DL) resource allocation information is called a "DL MAP message," and a MAP message for transmitting uplink (UL) resource allocation information is called a "UL MAP message."

If the BS transmits the downlink resource allocation information and the uplink resource allocation information through the DL MAP message and the UL MAP message in this way, each of the MSs decodes the DL MAP message and the UL MAP message transmitted by the BS, to thereby detect an allocated position of the resources allocated to the MS and control information of the data the MS should receive. By detecting the resource allocation position and the control information, the MS can receive and transmit the data through the downlink and the uplink.

The MAP message includes different MAP IE formats according to whether the MAP is a downlink or an uplink, whether the data burst type of the MAP IE is a Hybrid Automatic Repeat reQuest (HARQ) data burst or a non-HARQ data burst, and whether the MAP IE is control information. Therefore, the MS needs to be aware of the format of each MAP IE in order to decode the MAP IE. Each MAP IE can be distinguished using a Downlink Interval Usage Code (DIUC), for the downlink, and an Uplink Interval Usage Code (UIUC), for the uplink. FIG. 1 is a diagram illustrating a frame structure for a general IEEE 802.16e communication system.

Referring to FIG. 1, the frame includes a downlink sub-frame 100 and an uplink sub-frame 150. The downlink sub-frame 100 includes a preamble field 111, a Frame Control Header (FCH) field 113, a DL MAP message field 115, a UL MAP message field 117, and a plurality of DL Burst fields of a DL Burst #1 119-1, a DL Burst #2 119-2, a DL Burst #3 119-3, a DL Burst #4 119-4, and a DL Burst #5 119-5. The uplink sub-frame 150 includes a plurality of control channel fields 151-1, 151-2, and 151-3, and a plurality of UL Burst fields of a UL Burst #1 153-1, a UL Burst #2 153-2, and a UL Burst #3 153-3.

The preamble field 111 is used for transmitting a synchronization signal, i.e. a preamble sequence, for acquiring synchronization between a transmitter and a receiver, i.e. between a BS and an MS. The FCH field 113 is used for transmitting basic information on sub-channel, ranging, and modulation scheme. The DL MAP message field 115 is used for transmitting a DL MAP message, and the UL MAP message field 117 is used for transmitting a UL MAP message.

The DL MAP message field 115 includes a plurality of IEs, i.e. a first IE (IE#1) 115-1, a second IE (IE#2) 115-2, a third IE (IE#3) 115-3, a fourth IE (IE#4) 115-4, and a fifth IE (IE#5) 115-5. The first IE 115-1 includes information on the DL Burst #1 119-1, the second IE 115-2 includes information on the DL Burst #2 119-2, the third IE 115-3 includes information on the DL Burst #3 119-3, the fourth IE 115-4 includes information on the DL Burst #4 119-4, and the fifth IE 115-5 includes information on the DL Burst #5 119-5.

The UL MAP message field 117 includes a plurality of control channel IEs 117-1, 117-2 and 117-3, and a plurality of IEs, i.e. a first IE (IE#1) 117-4, a second IE (IE#2) 117-5, and a third IE (IE#3) 117-6. The control channel IE 117-1 includes information on the control channel field 151-1, the control channel IE 117-2 includes information on the control channel field 151-2, and the control channel IE 117-3 includes information on the control channel field 151-3. The first IE 117-4 includes information on the UL Burst #1 153-1, the second IE 117-5 includes information on the UL Burst #2 153-2, and the third IE 117-6 includes information on the UL Burst #3 153-3.

The DL Burst #1 119-1 to the DL Burst #5 119-5 are used for transmitting corresponding downlink data bursts, the control channel IEs 151-1, 151-2 and 151-3 are used for transmitting corresponding uplink control channel signals, and the UL Burst #1 153-1 to the UL Burst #3 153-3 are used for transmitting corresponding uplink data bursts.

The MS receives the DL MAP message and the UL MAP message, and decodes the received DL MAP message and UL MAP message to detect an IE, i.e. a MAP IE, that indicates information on the resources allocated thereto, thereby detecting a field of the resources allocated to the MS. Herein, each of the IEs included in the DL MAP message expresses its allocated position with its start time and size in the time domain and the frequency domain, and each of the IEs included in the UL MAP message expresses its allocated position as a multiple of a slot with its start time and size. The term "slot" refers to a minimum resource allocation unit composed of a sub-channel and a symbol.

The MS, upon receipt of a DL MAP message, sequentially decodes MAP IEs included in the DL MAP message. If the MS detects a MAP IE allocated to the MS in the course of decoding the MAP IEs, the MS can determine a position of the resources allocated to the MS using position information of the detected MAP IE. In addition, if the MS, upon receipt of a UL MAP message, adds up the fields occupied by all MAP IEs before detecting a MAP IE allocated to the MS, a position of the next field is a location of the MAP IE allocated to the MS itself. This will be described below with reference to FIG. 1.

If the third IE 117-6 included in the UL MAP message is information allocated to a corresponding MS, the amount of resources allocated to the MS corresponds to the resource allocation information appearing in the third IE 117-6 beginning from a part except for an occupied field, or slots, of the UL Burst #1 153-1 associated with the first IE 117-4 and an occupied field, or slots, of the UL Burst #2 153-2 associated with the second IE 117-5.

As described above, the IEEE 802.16e communication system can classify data bursts into an HARQ data burst and a non-HARQ data burst according to whether the HARQ scheme is applied thereto. Basically, the HARQ scheme is similar to an Automatic Repeat reQuest (ARQ) scheme of a Medium Access Control (MAC) protocol. In the HARQ scheme, a transmitter receives an Acknowledgement (ACK)/Non-Acknowledgement (NACK) signal for its transmission data, being fed back from a receiver, and retransmits the transmission data upon receipt of the NACK signal being fed back from the receiver, thereby increasing reliability of the transmission data. The receiver feeds back the ACK signal to the transmitter upon successful receipt of the data transmitted by the transmitter. The receiver feeds back the NACK signal to the transmitter upon failure to receive the data transmitted by the transmitter, i.e. upon detecting an error in the data transmitted by the transmitter.

To use the HARQ scheme in the downlink, the BS should allocate a field with which the MS will transmit the ACK/NACK signal in the uplink, in order to receive the ACK/NACK signal for its transmission data. In addition, to use the HARQ scheme in the uplink, the BS provides the information on the data the MS will retransmit and on the interval where the MS will retransmit the data, replacing a feedback operation of the ACK/NACK signal, or replacing a feedback operation of the ACK/NACK signal through a DL HARQ ACK IE.

For each of the downlink and the uplink, the HARQ scheme is divided into a total of 7 modes, i.e. an HARQ chase mode, an HARQ Incremental Redundancy (IR) mode, an HARQ IR Convolutional Turbo Coding (CTC) mode, an HARQ IR Chase Combining (CC) mode, a Multiple Input Multiple Output (MIMO) HARQ chase mode, a MIMO HARQ IR CC mode, and a MIMO HARQ Space Time Coding (STC) mode.

The MS selects a possible mode supportable by the MS from among the 7 modes through an operation of negotiating the basic capability of the MS with the BS, i.e. an operation of exchanging with the BS a Subscriber Station's Basic Capability Negotiation Request (SBC-REQ) message and a Subscriber Station's Basic Capability Negotiation Response (SBC-RSP) message with the BS.

In order to support the HARQ scheme, the BS includes MAP IEs supporting the HARQ scheme, i.e. an HARQ DL MAP IE and an HARQ UL MAP IE, in the DL MAP message, and transmits the DL MAP message. Then the MS decodes the HARQ DL MAP IE and the HARQ UL MAP IE, and detects DL HARQ burst information and UL HARQ burst information for the MS.

The HARQ DL MAP IE includes information on a downlink HARQ burst, and the HARQ UL MAP IE includes information on an uplink HARQ burst. The HARQ DL MAP IE and the HARQ UL MAP IE each include 7 sub-burst IEs for each individual mode. Each of the sub-burst IEs indicates a data burst position for the MS supporting the corresponding mode. For the downlink, the MS receives information on the interval in which the MS can feed back an ACK/NACK signal for the downlink HARQ bursts, i.e. information on all channels over which the MS can feed back the ACK/NACK signal, from the BS over an HARQ ACK Region Allocation IE. In all the channels, the position where the corresponding MS feeds back the ACK/NACK signal is determined depending on the order of receiving a position of an HARQ ACK enabled downlink HARQ burst (hereinafter referred to as an "HARQ ACK enabled downlink burst"). For convenience, a channel used for feeding back the ACK/NACK signal will be referred to herein as an "ACK channel." For example, an MS receiving an $n^{th}$ HARQ ACK enabled downlink burst feeds back an ACK/NACK signal for the $n^{th}$ HARQ ACK enabled downlink burst over an $n^{th}$ ACK channel among all the ACK channels notified by the HARQ ACK Region Allocation IE. The HARQ ACK enabled downlink burst is determined depending on an ACK disable bit value in each sub-burst IE, and a value of the ACK disable bit is set to '0' indicates that an ACK channel for ACK/NACK signal feedback is allocated to the MS receiving the corresponding downlink HARQ burst. On the contrary, value of the ACK disable bit is set to '1' indicates that an ACK channel for ACK/NACK signal feedback is not allocated to the MS receiving the corresponding downlink HARQ burst. The MS determines whether the received downlink HARQ burst is an HARQ ACK enabled downlink burst, based on the ACK disable bit, and if it is determined that the received downlink HARQ burst is the HARQ ACK enabled downlink burst, the MS feeds back the ACK/NACK signal over the corresponding ACK channel among all the ACK channels taking into account the order of the HARQ ACK enabled downlink burst. Of course, if the value of the ACK disable bit is set to '1', the MS does not feed back the ACK/NACK signal because no ACK channel is allocated thereto.

A format of the HARQ DL MAP IE is shown in Tables 1A and 1B.

TABLE 1A

| Syntax | Size (bits) | Notes |
| --- | --- | --- |
| HARQ DL MAP IE { | — | — |
| Extended-2 DIUC | 4 | HARQ DL MAP IE( ) = 0x07 |
| LENGTH | 8 | Length in bytes |
| RCID_Type | 2 | 0b00 = Normal CID 0b01 = RCID11 0b10 = RCID7 0b11 = RCID3 |
| Reserved | 2 | |
| While (data remains) { | — | — |
|   Region_ID use indicator | 1 | 0: not use Region_ID 1: use Region_ID |
|   If (Region_ID use indicator == 0) { | | |
|     OFDMA symbol offset | 8 | Offset from the start symbol of DL subframe |
|     Subchannel offset | 7 | — |
|     Number of OFDMA symbols | 7 | — |
|     Number of subchannels | 7 | — |
|     Reserved | 3 | |
|   } else { | | |

TABLE 1B

| Syntax | Size (bits) | Notes |
|---|---|---|
| Region_ID | 8 | Index to the DL region defined in DL region definition TLV in DCD |
| } | | |
| Mode | 4 | Indicates the mode of this IE 0b0000 = Chase HARQ 0b0001 = Incremental redundancy HARQ for CTC 0b0010 = Incremental redundancy HARQ for Convolutional Code 0b0011 = MIMO Chase H-ARQ 0b0100 = MIMO IR H-ARQ 0b0101 = MIMO IR H-ARQ for Convolutional Code 0b0110 = MIMO STC H-ARQ 0b0111-0b1111 Reserved |
| Boosting | 3 | 000; normal (not boosted); 001; +6dB; 010; −6dB; 011; +9dB; 100; +3dB; 101; −3dB; 110; −9dB; 111; −12dB; |
| If (Mode == 0b0000) { | — | — |
| DL HARQ Chase sub-burst IE ( ) | variable | — |
| } else if (Mode == 0b0001) { | — | — |
| DL HARQ IR CTC sub-burst IE ( ) | variable | — |
| } else if (Mode == 0b0010) { | — | — |
| DL HARQ IR CC sub-burst IE ( ) | variable | — |
| } else if (Mode == 0b0011) { | | |
| MIMO DL Chase H-ARQ Sub-Burst IE ( ) | variable | |
| } else if (Mode == 0b0100) { | | |
| MIMO DL IR H-ARQ Sub-Burst IE ( ) | variable | |
| } else if (Mode == 0b0101) { | | |
| MIMO DL IR H-ARQ for CC Sub-Burst IE ( ) | variable | |
| } else if (Mode == 0b0110) { | | |
| MIMO DL STC H-ARQ Sub-Burst IE ( ) | variable | |
| } | — | — |
| } | — | — |
| Padding | variable | Padding to byte; shall be set to 0 |
| } | — | |

A format of the HARQ UL MAP IE is shown in Tables 2A to 2C.

TABLE 2A

| Syntax | Size (bits) | Notes |
|---|---|---|
| HARQ UL MAP IE( ) { | — | — |
| Extended-2 UIUC | 4 | HARQ UL MAP IE ( ) = 0x07 |
| Length | 8 | Length in bytes |
| RCID_Type | 2 | 0b00 = Normal CID 0b01 = RCID11 0b10 = RCID7 0b11 = RCID3 |
| Reserved | 2 | |
| while (data remains) { | — | — |

TABLE 2B

| Syntax | Size (bits) | Notes |
|---|---|---|
| Allocation Start Indication | 1 | 0: No allocation start information 1: Allocation start information follows |
| If(Allocation Start Indication ==1) { | — | — |
| OFDMA Symbol offset | 8 | This value indicates start Symbol offset of subsequent sub-bursts in this HARQ UL MAP IE |
| Subchannel offset | 7 | This value indicates start Subchannel offset of subsequent sub-bursts in this HARQ UL MAP IE |
| Reserved | 1 | |
| } | — | — |
| Mode | 3 | Indicates the mode of this IE 0b000 = Chase |

TABLE 2B-continued

| Syntax | Size (bits) | Notes |
|---|---|---|
| | | HARQ 0b001 = Incremental redundancy HARQ for CTC 0b010 = Incremental redundancy HARQ for Convolutional code 0b011 = MIMO Chase H-ARQ 0b100 = MIMO IR H-ARQ 0b101 =MIMO IR H-ARQ for Convolutional Code 0b110 =MIMO STC H-ARQ 0b111=Reserved |
| N sub Burst | 4 | Indicates the number of bursts in this UL MAP IE |
| For (i=0; i<N Sub-burst; i++) { | — | — |
| If(Mode == 000) | — | — |
| UL HARQ Chase Sub-Burst IE ( ) | variable | — |
| } else if (Mode == 001) { | — | — |
| UL HARQ IR CTC Sub-Burst IE ( ) | variable | — |
| } else if (Mode == 010) { | — | — |
| UL HARQ IR CC Sub-Burst IE ( ) | variable | — |
| } else if (Mode == 011) { | | |
| MIMO UL Chase H-ARQ Sub-Burst IE ( ) | variable | |
| } else if (Mode == 100) { | | |
| MIMO UL IR H-ARQ Sub-Burst IE ( ) | variable | |
| } else if (Mode == 101) { | | |
| MIMO UL IR H-ARQ for CC Sub-Burst IE ( ) | variable | |
| } else if (Mode == 110) { | | |
| MIMO UL STC H-ARQ Sub-Burst IE ( ) | variable | |

TABLE 2C

| Syntax | Size (bits) | Notes |
|---|---|---|
| } | — | — |
| } | — | — |
| } | — | — |
| Padding | variable | Padding to byte; shall be set to 0 |
| } | — | — |

In addition, there are downlink sub-burst IEs and uplink sub-burst IEs for each of the 7 modes. For example, a format of sub-burst IEs for the HARQ chase mode, i.e. DL HARQ chase sub-burst IEs, among the downlink sub-burst IEs, is shown in Tables 3A and 3B.

TABLE 3A

| Syntax | Size (bits) | Notes |
|---|---|---|
| DL HARQ Chase sub-burst IE { | — | — |
| N sub burst[ISI] | 5 | Number of sub-bursts in the 2D region |
| Reserved | 3 | Shall be set to zero. |
| For (j=0; j< N sub burst; j++) { | — | — |

TABLE 3A-continued

| Syntax | Size (bits) | Notes |
|---|---|---|
| RCID-IE( ) | variable | — |
| Duration | 10 | Duration in slots |
| Sub-Burst DIUC Indicator | 1 | If Sub-Burst DIUC Indicator is 1, it indicates that DIUC is explicitly assigned for this sub-burst. Otherwise, this sub-burst will use the same DIUC as the previous sub-burst If j is ( ) then indicator shall be 1. |
| Reserved | 1 | Shall be set, to zero. |
| If(Sub-Burst DIUC Indicator ==1) { | | |
| DIUC | 4 | |
| Repetition Coding Indication | 2 | 0b00—No repetition coding 0b01—Repetition coding of 2 used 0b10—Repetition coding of 4 used 0b11—Repetition coding of 6 used |
| Reserved | 2 | Shall be set to zero. |
| } | | |
| ACID | 4 | — |
| AI_SN | 1 | — |
| ACK disable | 1 | When this bit is "1" no ACK channel is allocated and the SS shall not reply with an ACK. |
| Dedicated DL Control Indicator | 2 | LSB #0 indicates inclusion of CQI control LSB #1 indicates inclusion of Dedicated DL Control IE |
| If (LSB #0 of Dedicated DL Control Indicator == 1) { | — | — |
| Duration (d) | 4 | A CQI feedback is transmitted on the CQI channels indexed by the (CQI Channel Index) by the SS for $2^{(d-1)}$ frames. If d is 0b0000, deallocates all CQI feedback when the current ACID is completed successfully. If d is 0b1111, the MS should report until the BS command for the MS to stop |
| If (Duration !=0b0000){ | | |

TABLE 3B

| Syntax | Size (bits) | Notes |
|---|---|---|
| Allocation Index | 6 | Index to the channel in a frame the CQI report should be transmitted by the SS |
| Period(p) | 3 | A CQI feedback is transmitted on the CQI channels indexed by the (CQI Channel Index) by the SS in every $2^p$ frames. |
| Frame offset | 3 | The MS starts reporting at the frame of which the number has the same 3 LSB as the specified frame offset. If the current frame is specified, the MS should start reporting in 8 frames. |
| } | — | — |
| } | — | — |

TABLE 3B-continued

| Syntax | Size (bits) | Notes |
| --- | --- | --- |
| If (LSB #1 of Dedicated DL Control Indicator == 1) { | — | — |
|    Dedicated DL Control IE ( ) | variable | — |
| } | — | — |
| } | — | — |
| } | — | — |

In Tables 1A, 1B, 2A to 2C, 3A and 3B, a Syntax field represents a type of each parameter, a Size field represents a size of each parameter, and a Notes field represents a function of each parameter.

With reference to Tables 1A and 1B, a description will now be made of an operation of decoding the HARQ DL MAP IE.

An MS reads a 4-bit Extended-2 DIUC value, and recognizes that a corresponding MAP IE is an HARQ DL MAP IE, if the Extended-2 DIUC value is 7. Thereafter, the MS performs a loop denoted by 'while(data remains)' and reads a 3-bit mode value, thereby determining a type of the next sub-burst IE, and decodes the sub-burst IE by applying the format of the sub-burst IE. The MS performs this decoding operation by performing the loop according to the size indicated by an 8-bit Length parameter existing under the Extended-2 DIUC parameter, completing decoding of the HARQ DL MAP IE. The operation of decoding the HARQ DL MAP IE can also be applied to the HARQ UL MAP IE in a similar way.

As described above, in order to decode MAP messages transmitted by a BS, the MS must be informed of a format of each MAP IE included in the MAP messages. As shown in the HARQ DL MAP IE of Tables 1A and 1B and the HARQ UL MAP IE of Tables 2A to 2C, if the MS reads a Mode parameter value indicating a mode of the HARQ scheme, the MS can determine whether the mode is a supportable mode or not. Because the MS has already provided information on STET supportable mode to the BS during an MS's basic capability negotiation operation, the MS is not allocated resources through a sub-burst IE including the information on the insupportable mode.

However, as shown in the HARQ DL MAP IE of Tables 1A and 1B and the HARQ UL MAP IE shown in Tables 2A to 2C, even for a sub-burst IE associated with its unsupportable mode, the MS needs to be informed of a format of the sub-burst IE in order to normally decode the HARQ DL MAP IE and the HARQ UL MAP IE.

In the case where the HARQ DL MAP IE included in the DL MAP message transmitted by the BS includes sub-burst IEs for each of the 7 modes, and the MS can support only one of the 7 modes, the BS, because it allocates information on the MS through the sub-burst IE for the mode supportable by the MS, has no need to decode the remaining 6 sub-burst IEs except for the sub-burst IE for the one supportable mode. In the current IEEE 802.16e communication system, the MS decode not only the sub-burst IEs for its supportable mode but also the sub-burst IEs for its unsupportable mode, in order to normally decode the DL MAP message and the UL MAP message. A format of the sub-burst IE is very complicated, causing an increase in decoding time required for decoding the sub-burst IE.

As described above, the MS should decode MAP messages, i.e. the DL MAP message and the UL MAP message, in order to detect a position of the resources allocated to the MS and the control information. As a result, the time required for decoding the DL MAP message and the UL MAP message affects performance of the MS.

For example, in the downlink, an increase in the time required for decoding the DL MAP message and the UL MAP message causes a time delay, so the MS must store all data related to the time delay. The MS, as it stores all data related to the time delay, needs to include a large-sized storage device, for example, a memory buffer. As another example, in the uplink, as the DL MAP message and the UL MAP message are decoded faster, Medium Access Control (MAC) software can secure the time enough to process the data. Therefore, there is a need for a method for rapidly decoding the UL MAP message and the UL MAP message.

SUMMARY OF THE INVENTION

It is, therefore, an aspect of the present invention to provide a system and method for transmitting/receiving resource allocation information in a communication system.

It is another aspect of the present invention to provide a system and method for transmitting/receiving an HARQ MAP IE at high speed in a communication system.

It is further another aspect of the present invention to provide an HARQ MAP IE transmission/reception system and method for decoding only the sub-burst IE for the HARQ mode supportable by an MS in a communication system.

It is yet another aspect of the present invention to provide an HARQ MAP IE transmission/reception system and method for providing ACK channel position information so that an MS may correctly feed back an ACK/NACK signal even while decoding only the sub-burst IE for it's the MS supportable HARQ mode, in a communication system.

According to one aspect of the present invention, there is provided a system for transmitting/receiving downlink resource allocation information in a communication system. In the system, a base station generates first information including downlink resource allocation information necessary for supporting a first mode supported by the base station, generates second information including length information of the first information, and transmits the first information and the second information. A mobile station notifies the base station of a second mode supported by the mobile station the base station, receives, after the notification, the first information and the second information from the base station, and skips without decoding as much downlink resource allocation information as a length corresponding to the length information without decoding, if the first mode is different from the second mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
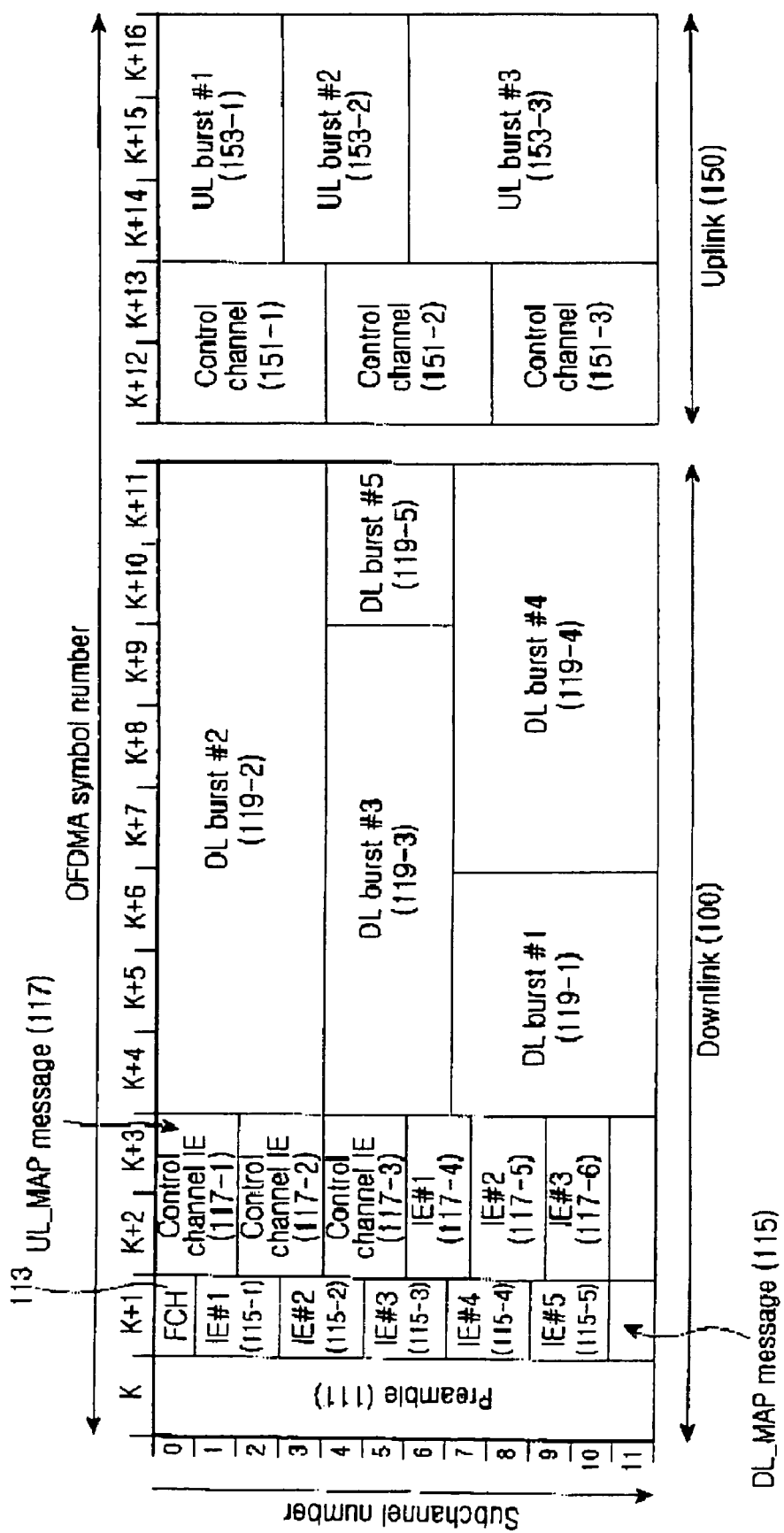
FIG. 1 is a diagram illustrating a frame structure for a general IEEE 802.16e communication system.

Exemplary embodiments of the present invention will now be described in detail with reference to the annexed drawings. In the following description, a detailed description of known functions and configurations incorporated herein has been omitted for clarity and conciseness.

In the case where the HARQ DL MAP IE included in the DL MAP message transmitted by the BS includes sub-burst IEs for each of the 7 modes, and the MS can support only one of the 7 modes, the BS, because it allocates information on the MS through the sub-burst IE for the mode supportable by the MS, has no need to decode the remaining 6 sub-burst IEs except for the sub-burst IE for the one supportable mode.

The present invention proposes a system and method for transmitting/receiving resource allocation information, for example, a Hybrid Automatic Repeat reQuest (HARQ) MAP Information Element (IE) in a communication system, for example, in an Institute of Electrical and Electronics Engineers (IEEE) 802.16e standard based communication system. In particular, the present invention proposes a system and method for transmitting/receiving an HARQ MAP IE at high speed by allowing a mobile station (MS) to decode only the sub-burst IE for its supportable HARQ mode in the IEEE 802.16e communication system. Although the present invention will be described with reference to the IEEE 802.16e communication system for convenience, the method proposed by the present invention can also be applied to other communication systems as well as the IEEE 802.16e communication system.

A format of the HARQ Downlink (DL) MAP IE proposed by the present invention is shown in Tables 4A and 4B.

TABLE 4A

| Syntax | Size (bits) | Notes |
|---|---|---|
| HARQ DL MAP IE { | — | — |
| Extended-2 DIUC | 4 | HARQ_DL_MAP_IE( ) = 0x07 |
| Length | 8 | Length in bytes |
| RCID-Type | 2 | 0b00 = Normal CID 0b01 = RCID11 0b10 = RCID7 0b11=RCID3 |
| Reserved | 2 | |
| While(data remains) { | — | — |
|    Region_ID use indicator | 1 | 0: not use Region_ID 1: use Region_ID |
| If(Region_ID use indicator == 0) { | | |
|    OFDMA symbol offset | 8 | Offset from the start symbol of DL subframe |
| Subchannel offset | 7 | — |
|    Number of OFDMA symbols | 7 | — |
|      Number of subchannels | 7 | — |
| Reserved | 3 | |
| } else { | | |

TABLE 4B

| Syntax | Size (bits) | Notes |
|---|---|---|
| Region_ID | 8 | Index to the DL region defined in DL region definition TLV in DCD |
| } | | |
| Mode | 4 | Indicates the mode of this IE 0b0000 = Chase HARQ 0b0001 = Incremental redundancy HARQ for CTC 0b0010 = Incremental redundancy HARQ for Convolutional Code 0b0011 = MIMO Chase H-ARQ 0b0100 = MIMO IR H-ARQ 0b0101 = MIMO IR H-ARQ for Convolutional Code 0b0110 = MIMO STC H-ARQ 0b0111-0b1111 Reserved |
| Boosting | 3 | 000: normal (not boosted); 001: +6dB; 010: −6dB; 011: +9dB; 100: +3dB; 101: −3dB; 110: −9dB; 111: −12dB; |
| Length | 8 | Length in nibbles to indicate the size of the sub-burst IE in this HARQ mode |
| If(Mode == 0b0000) {    DL HARQ Chase sub-burst IE ( ) | variable | — |
|    } else if (Mode == 0b0001) {    DL HARQ IR CTC sub-burst IE ( ) | variable | — |
|    } else if (Mode == 0b0010) {    DL HARQ IR CC sub-burst IE ( ) | variable | — |
|    } else if (Mode == 0b0011) { MIMO DL Chase H-ARQ Sub-Burst IE ( ) | variable | |
|    } else if (Mode == 0b0100) { MIMO DL IR H-ARQ Sub-Burst IE ( ) | variable | |
|    } else if (Mode == 0b0101) { MIMO DL IR H-ARQ for CC Sub-Burst IE ( ) | variable | |
|    } else if (Mode == 0b0110) { MIMO DL STC H-ARQ Sub-Burst IE ( ) | variable | |
| } | — | — |
| } | — | — |
| Padding | variable | Padding to byte; shall be set to 0 |
| } | — | |

In Tables 4A and 4B, a Syntax field represents a type of each parameter, a Size field represents a size of each parameter, and a Notes field represents a function of each parameter. The HARQ DL MAP IE format is equal to the format of the HARQ DL MAP IE of the general IEEE 802.16e communication system, shown in Tables 1A and 1B, except for a Length parameter indicating a length of a sub-burst for a corresponding HARQ mode. Therefore, a detailed description of the parameters other than the Length parameter will be omitted. The Length parameter represents a size of its succeeding sub-burst IE in nibble (4 bits). The Length parameter newly proposed by the present invention is shown in Table 4B under a Boosting parameter.

Next, formats of a DL HARQ Chase sub-burst IE, a DL HARQ Incremental Redundancy (IR) Convolutional Turbo Coding (CTC) sub-burst IE, and a DL HARQ IR Chase Combining (CC) sub-burst IE, proposed by the present invention, are shown in Tables 5A to 5C, respectively.

TABLE 5A

| Syntax | Size (bits) | Notes |
|---|---|---|
| DL HARQ Chase sub-burst IE ( ){ | | |
| N sub burst[ISI] | 4 | Number of sub-bursts in the 2D region |
| N.ACK channel | 4 | Number of HARQ ACK enabled sub-bursts in the 2D region |
| For (j=0; j<N sub burst; j++){ | | |
| RCID_IE( ) | variable | |
| Duration | 10 | Duration in slots |
| Sub-Burst DIUC Indicator | 1 | If Sub-Burst DIUC Indicator is 1, it indicates that DIUC is explicitly assigned for this sub-burst. Otherwise, this sub-burst will use the same DIUC as the previous sub-burst If j is 0 then this indicator shall be 1. |

TABLE 5B

| Syntax | Size (bits) | Notes |
|---|---|---|
| DL HARQ IR CC sub-burst IE( ) { | | |
| N sub burst | 4 | |
| N.ACK channel | 4 | Number of HARQ ACK enabled sub-bursts in the 2D region |
| For (j=0; j< N sub burst; j++){ | | |
| RCID_IE( ) | variable | |

TABLE 5C

| Syntax | Size (bits) | Notes |
|---|---|---|
| DL HARQ IR CC sub-burst IE( ) { | | |
| N sub burst | 4 | |
| N.ACK channel | 4 | Number of HARQ ACK enabled sub-bursts in the 2D region |
| For (j=0; j< N sub burst; j++){ | | |
| RCID_IE( ) | variable | |

N.ACK channel shown in Tables 5A to 5C indicates the number of ACK channels allocated to the MSs that will receive an HARQ ACK enabled downlink HARQ burst (hereinafter referred to as an "HARQ ACK enabled downlink burst"), in a sub-buffer IE. The term "ACK channel" refers to a channel used for feeding back an Acknowledgement (ACK)/Non-Acknowledgement (NACK) signal. The HARQ ACK enabled downlink burst is determined depending on an ACK disable bit value in each sub-burst IE, and a value of the ACK disable bit is set to '0' indicates that an ACK channel for ACK/NACK signal feedback is allocated to the MS receiving a corresponding downlink HARQ burst. On the contrary, a value of the ACK disable bit is set to '1' indicates that an ACK channel for ACK/NACK signal feedback is not allocated to the MS receiving a corresponding downlink HARQ burst.

The other parameters except for the N.ACK channel in Tables 5A to 5C are not directly related to the general understanding of the present invention, so a detailed description thereof will be omitted.

Next, formats of Multiple Input Multiple Output (MIMO) DL Chase HARQ sub-burst IE, a MIMO DL IR HARQ sub-burst IE, a MIMO DL IR H-ARQ for CC sub-burst IE, and a MIMO DL Space Time Coding (STC) HARQ sub-burst IE, proposed by the present invention, are shown in Tables 6A to 6D, respectively.

TABLE 6A

| Syntax | Size (bits) | Notes |
|---|---|---|
| MIMO_DL_Chase_HARQ_Sub-Burst_IE( ) { | | |
| N sub burst | 4 | Number of sub-bursts in the 2D region |
| N.ACK channel | 6 | Number of HARQ ACK enabled sub-bursts in the 2D region |
| For (j=0; j< N sub burst; j++){ | | |
| MU Indicator | 1 | Indicates whether this DL burst is intended for multiple SS |

TABLE 6B

| Syntax | Size (bits) | Notes |
|---|---|---|
| MIMO DL IR H-ARQ Sub-Burst IE{ | | |
| N sub burst | 4 | Number of sub-bursts in the 2D region |
| N.ACK channel | 6 | Number of HARQ ACK enabled sub-bursts in the 2D region |
| For (j=0; j< N sub burst; j++){ | | |
| MU Indicator | 1 | Indicates whether this DL burst is Intended for multiple SS |

TABLE 6C

| Syntax | Size (bits) | Notes |
|---|---|---|
| MIMO DL IR H-ARQ for CC Sub-Burst IE{ | | |
| N sub burst | 4 | Number of sub-bursts in the 2D region |
| N.ACK channel | 6 | Number of HARQ ACK enabled sub-bursts in the 2D region |
| For (j=0; j< N sub burst; j++){ | | |
| MU Indicator | 1 | Indicates whether this DL burst is intended for multiple SS |

TABLE 6D

| Syntax | Size (bits) | Notes |
|---|---|---|
| MIMO DL STC H-ARQ Sub-Burst IE { | | |
| N sub burst | 4 | Number of sub-bursts in the 2D region |
| N.ACK channel | 6 | Number of HARQ ACK enabled sub-bursts in the 2D region |

TABLE 6D-continued

| Syntax | Size (bits) | Notes |
| --- | --- | --- |
| For (j=0; j< N sub burst; j++){ Tx count | 2 | 00: initial transmission 01: odd retransmission 10: even retransmission 11: reserved |

N.ACK channel shown in Tables 6A to 6D indicates the number of ACK channels allocated to the MSs that will receive an HARQ ACK enabled downlink burst, in a sub-buffer IE. The other parameters except for the N.ACK channel in Tables 6A to 6D are not directly related to the general understanding of the present invention, so a detailed description thereof will be omitted.

Next, a format of an HARQ Uplink (UL) MAP IE proposed by the present invention is shown in Tables 7A to 7C.

TABLE 7A

| Syntax | Size (bits) | Notes |
| --- | --- | --- |
| HARQ UL MAP IE( ) { | — | — |
| Extended-2 UIUC | 4 | HARQ_UL_MAP_IE ( ) = 0x07 |
| Length | 8 | Length in bytes |
| RCID_Type | 2 | 0b00 = Normal CID 0b01 = RCID11 0b10 = RCID7 0b11 = RCID3 |
| Reserved | 2 | |
| while (data remains) { | — | — |

TABLE 7B

| Syntax | Size (bits) | Notes |
| --- | --- | --- |
| Allocation Start Indication | 1 | 0: No allocation start information 1: Allocation start information follows |
| If (Allocation Start Indication == 1) { | — | — |
| OFDMA Symbol offset | 8 | This value indicates start Symbol offset of subsequent sub-bursts in this HARQ UL MAP IE |
| Subchannel offset | 7 | This value indicates start Subchannel offset of subsequent sub-bursts in this HARQ UL MAP IE |
| Reserved | 1 | |
| } | — | — |
| Mode | 3 | Indicates the mode of this IE 0b000 = Chase HARQ 0b001 = Incremental redundancy HARQ for CTC 0b010 = Incremental redundancy HARQ for Convolutional code 0b011 = MIMO Chase H-ARQ 0b100 = MIMO IR H-ARQ 0b101 = MIMO IR H-ARQ for Convolutional Code 0b110 = MIMO STC H-ARQ 0b111 = Reserved |
| N sub Burst | 4 | Indicates the number of bursts in this UL MAP IE |
| Duration | 12 | Indicates the sum of the duration(or Nsch), in units of OFDMA slots, of sub-burst IEs in this HARQ region |
| Length | 8 | Length in nibbles to indicate the total size of all the sub-burst IEs in this HARQ mode |
| For (i=0; i<N Sub-burst; i++) { | — | — |
| If(Mode == 000) | — | — |
| UL HARQ Chase Sub-Burst IE ( ) | — | — |
| } else if (Mode == 001) { | — | — |
| UL HARQ IR CTC Sub-Burst IE ( ) | — | — |
| } else if (Mode == 010) { | — | — |
| UL HARQ IR CC Sub-Burst IE ( ) | — | — |
| } else if (Mode == 011) { MIMO UL Chase H-ARQ Sub-Burst IE ( ) | — | — |
| } else if (Mode == 100) { MIMO UL IR H-ARQ Sub-Burst IE ( ) | — | — |
| } else if (Mode == 101) { MIMO UL IR H-ARQ for CC Sub-Burst IE ( ) | — | — |
| } else if (Mode == 110) { MIMO UL STC H-ARQ Sub-Burst IE ( ) | — | — |

TABLE 7C

| Syntax | Size (bits) | Notes |
| --- | --- | --- |
| } | — | — |
| } | — | — |
| } | — | — |
| Padding | variable | Padding to byte; shall be set to 0 |
| } | — | — |

In Tables 7A to 7C, a Syntax field represents a type of each parameter, a Size field represents a size of each parameter, and a Notes field represents a function of each parameter. The HARQ UL MAP IE format is equal to the format of the HARQ UL MAP IE of the general IEEE 802.16e communication system, shown in Tables 2A to 2C, except for a Duration parameter expressing a sum of the resources allocated in a sub-burst for a corresponding HARQ mode in slots, and a Length parameter indicating a length of the sub-burst for the corresponding HARQ mode. Therefore, a detailed description of the parameters other than the Duration parameter and the Length parameter will be omitted. The Length parameter represents a size of its succeeding sub-burst IE in nibbles (4 bits). The term "slot" refers to a minimum resource allocation unit composed of a sub-channel and a symbol. The Length parameter newly proposed by the present invention is under the Duration parameter. The Duration parameter is added to indicate the amount of resources allocated in a previous sub-burst IE because due to the uplink characteristics of the IEEE 802.16e communication system, there is a need to know the amount of the resources allocated in the previous sub-burst IE in order to determine a position of the resources allocated to a corresponding MS.

Figure 2:
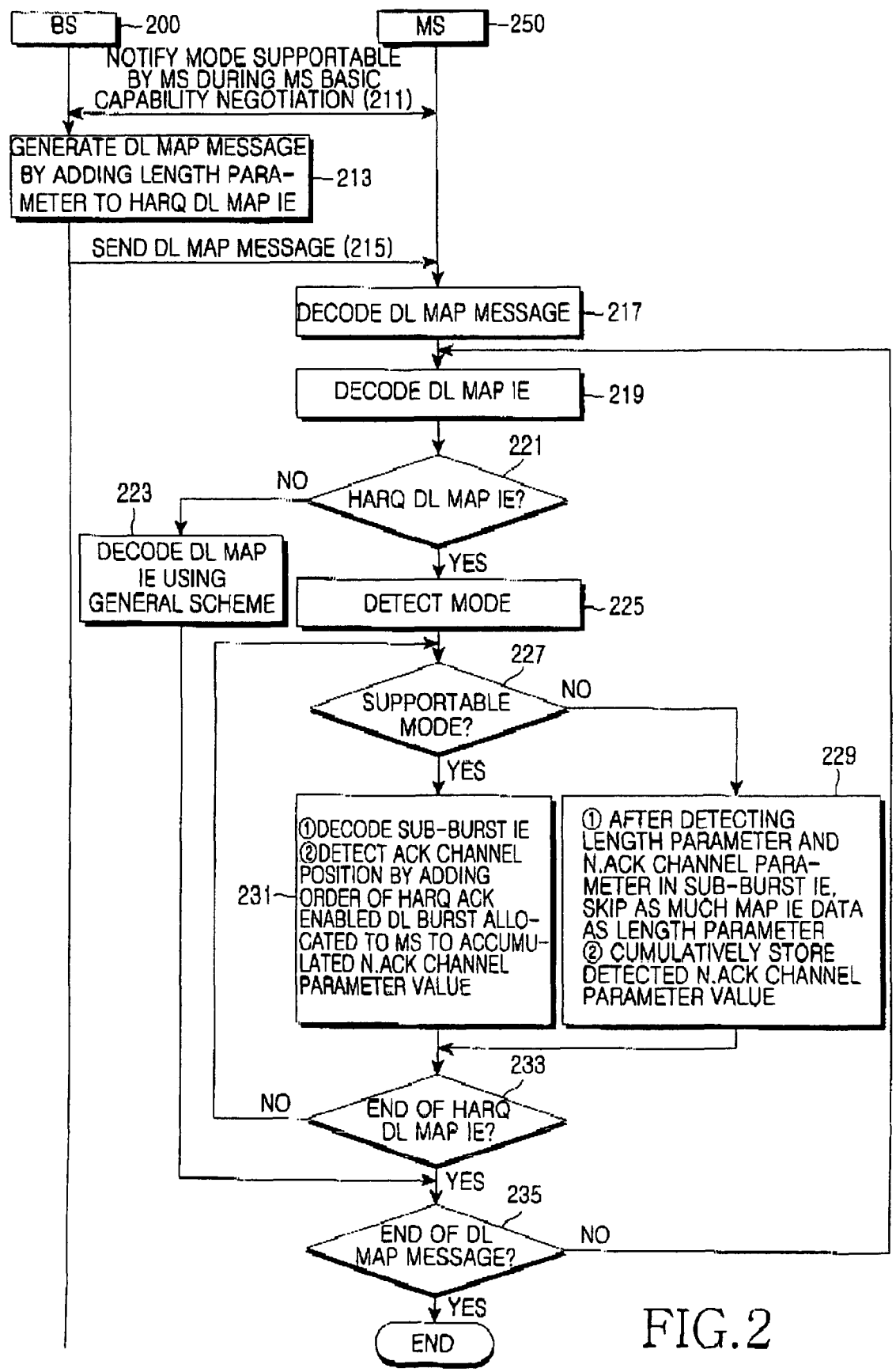
FIG. 2 is a signaling diagram illustrating an HARQ DL MAP IE transmission/reception operation according to the present invention.

FIG. 2 is a signaling diagram illustrating an HARQ DL MAP IE transmission/reception operation according to the present invention.

Referring to FIG. 2, an MS 250 selects its supportable mode from among a total of 7 modes supportable in the IEEE 802.16e communication system through an MS's basic capability negotiation operation with a base station (BS) 200, i.e. an operation of exchanging with the BS 200 a Subscriber Station's Basic Capability Negotiation Request (SBC-REQ) message and a Subscriber Station's Basic Capability Negotiation Response (SBC-RSP) message with the BS 200, and sends a notification indicating the selected supportable mode to the BS 200 in step 211. The total of 7 modes, as described above, include an HARQ chase mode, an HARQ Incremental Redundancy (IR) mode, an HARQ IR Convolutional Turbo Coding (CTC) mode, an HARQ IR Chase Combining (CC) mode, a Multiple Input Multiple Output (MIMO) HARQ chase mode, a MIMO HARQ IR CC mode, and a MIMO HARQ Space Time Coding (STC) mode.

Upon receipt of the notification indicating the mode supportable by the MS 250, the BS 200 generates a DL MAP message by including a Length parameter indicating a length of a sub-burst IE for the selected mode in an HARQ DL MAP IE in step 213, and broadcasts the generated DL MAP message in step 215. The MS 250 receives the DL MAP message broadcast by the BS 200, and starts decoding the received DL MAP message in step 217. The MS 250 starts decoding a DL MAP IE as it starts decoding the DL MAP message in step 219, and determines in step 221 whether the decoding-started DL MAP IE is an HARQ DL MAP IE. If it is determined that the decoding-started DL MAP IE is not the HARQ DL MAP IE, the MS 250 decodes the DL MAP IE using a general decoding scheme in step 223.

However, if it is determined that the decoding-started DL MAP IE is the HARQ DL MAP IE, the MS 250 detects a mode included in the HARQ DL MAP IE in step 225. The MS 250 determines in step 227 whether the mode included in the HARQ DL MAP IE is the MS 250 supportable mode. If it is determined that the mode included in the HARQ DL MAP IE is not the MS 250 supportable mode, the MS 250 proceeds to step 229. In step 229, the MS 250 detects a Length parameter included in the HARQ DL MAP IE, and detects an N.ACK channel parameter in the sub-burst IE. Further, if there is a previously detected N.ACK channel parameter value, the MS 250 adds up the previously detected N.ACK channel parameter value and the currently detected N.ACK channel parameter value, and cumulatively stores the addition result. If there is no previously detected N.ACK channel parameter value, the MS 250 cumulatively stores only the currently detected N.ACK channel parameter value. After storing the current N.ACK channel parameter value, the MS 250 skips as much DL MAP IE data as the Length parameter without decoding. Herein, the Length parameter enables the MS 250 to skip a sub-burst IE for its unsupportable mode without the need for decoding every sub-burst IE, and the N.ACK channel in the sub-burst IE, as N.ACK channel notifies the number of ACK channels allocated in the sub-burst IE, enables the MS 250 to correctly identify a position of the ACK channel allocated thereto when decoding the sub-burst IE for the MS 250 supportable mode.

However, if it is determined in step 227 that the mode included in the HARQ DL MAP IE is the MS 250 supportable mode, the MS 250 proceeds to step 231. In step 231, the MS 250 decodes the sub-burst IE included in the HARQ DL MAP IE and finds an allocated data field. If there is an allocated ACK channel, i.e. if the allocated data is an HARQ ACK enabled downlink burst, the MS 250 adds an order of the HARQ ACK enabled downlink burst allocated to the MS 250 in the current mode to the previous N.ACK channel parameter value, to correctly detect a position of the ACK channel allocated to the MS 250. Thereafter, the MS 250 determines in step 233 whether a decoding end time of the HARQ DL MAP IE, i.e. an end of the HARQ DL MAP IE, has arrived. If it is determined that the end of the HARQ DL MAP IE has arrived, the MS 250 determines in step 235 whether an end time of the HARQ DL MAP IE, i.e. an end of the DL MAP message, has arrived. If it is determined that the end of the DL MAP message has arrived, the MS 250 ends decoding of the DL MAP message. The HARQ DL MAP IE decoding operation described in connection with FIG. 2 repeatedly performs the loop as many times as the size indicated by the 8-bit Length parameter existing under an Extended-2 Downlink Interval Usage Code (DIUC) parameter of the HARQ DL MAP IE. It should be noted herein that the 8-bit Length parameter under shown in Table 4A the Extended-2 DIUC parameter is different from the newly proposed Length parameter shown in Table 4B under the Boosting parameter.

As described in FIG. 2, the MS 250 skips the sub-burst IEs including information on its insupportable modes without decoding the sub-burst IEs according to the Length parameter, and decodes only the sub-burst IE including information on its supportable mode, thereby minimizing the required decoding time.

Figure 3:
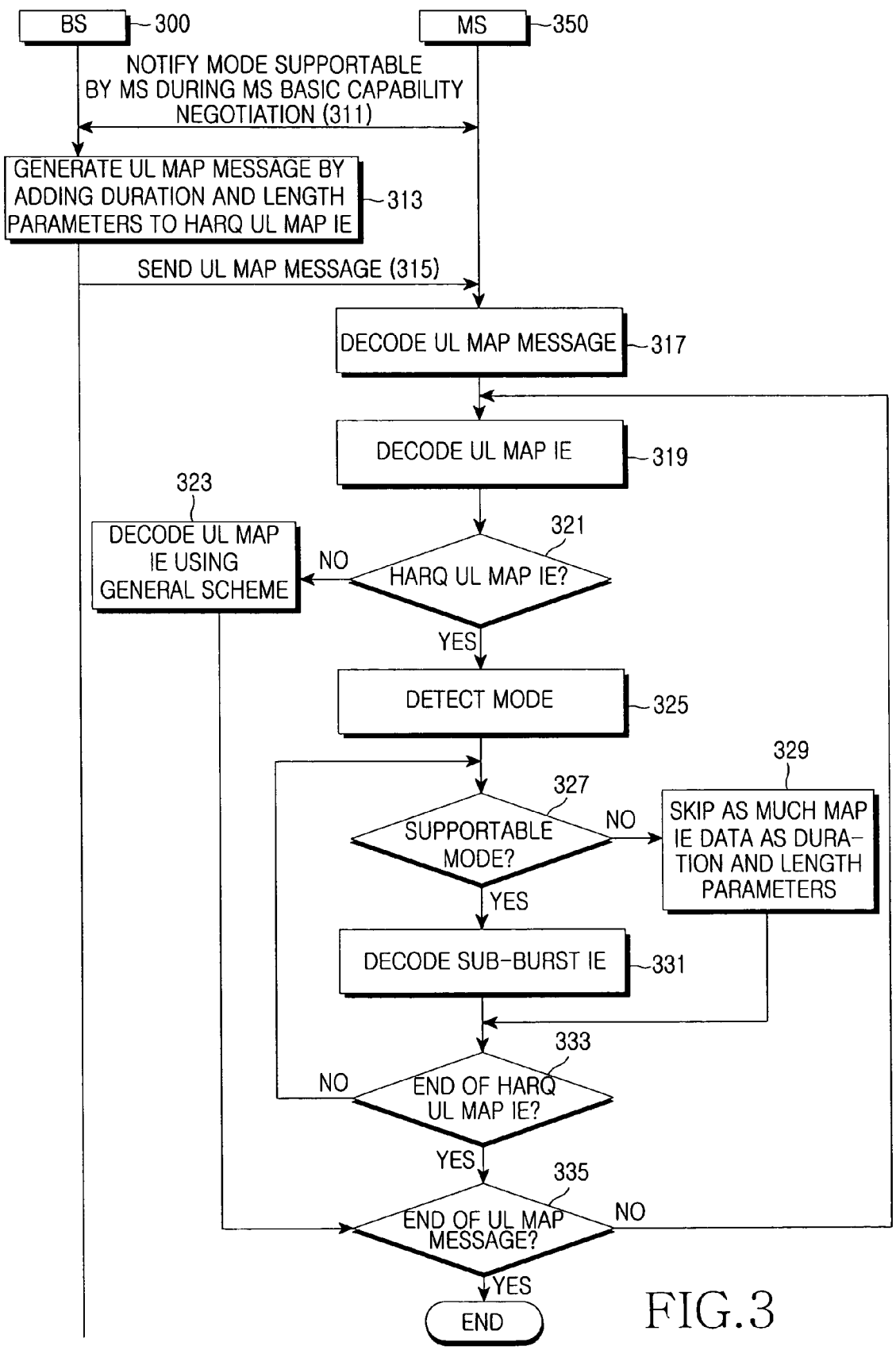
FIG. 3 is a signaling diagram illustrating an HARQ UL MAP IE transmission/reception operation according to the present invention.

FIG. 3 is a signaling diagram illustrating an HARQ UL MAP IE transmission/reception operation according to the present invention.

Referring to FIG. 3, an MS 350 selects its supportable mode from among a total of 7 modes supportable in the IEEE 802.16e communication system through an MS's basic capability negotiation operation with a BS 300, i.e. an operation of exchanging with the BS 300 an SBC-REQ message and an SBC-RSP message with the BS 300, and sends to the BS 300 a notification indicating the selected supportable mode to the BS 300 in step 311. The total of 7 modes include an HARQ chase mode, an HARQ IR mode, an HARQ IR CTC mode, an HARQ IR CC mode, a MIMO HARQ chase mode, a MIMO HARQ IR CC mode, and a MIMO HARQ STC mode.

Upon receipt of the notification indicating the mode supportable by the MS 350, the BS 300 generates a UL MAP message by including a Duration parameter indicating the amount of resources allocated to the corresponding MS in a sub-burst IE for the selected mode and a Length parameter indicating a length of the sub-burst IE in an HARQ UL MAP IE in step 313, and broadcasts the generated UL MAP message in step 315. The MS 350 receives the UL MAP message broadcast by the BS 300, and starts decoding the received UL MAP message in step 317. The MS 350 starts decoding a UL MAP IE as the MS 350 starts decoding the UL MAP message in step 319, and determines in step 321 whether the decoding-started UL MAP IE is an HARQ UL MAP IE. If it is determined that the decoding-started UL MAP IE is not the HARQ UL MAP IE, the MS 350 decodes the UL MAP IE using a general decoding scheme in step 323.

However, if it is determined that the decoding-started UL MAP IE is the HARQ UL MAP IE, the MS 350 detects a mode included in the HARQ UL MAP IE in step 325. The MS 350 determines in step 327 whether the mode included in the HARQ UL MAP IE is the MS 350 supportable mode. If it is determined that the mode included in the HARQ UL MAP IE is not the MS 350 supportable mode, the MS 350 detects the Duration parameter and the Length parameter included in the HARQ UL MAP IE, and skips as much UL MAP IE data as the Duration parameter and the Length parameter without decoding in step 329.

However, if it is determined that the mode included in the HARQ UL MAP IE is a MS 350 its supportable mode, the MS 350 decodes a sub-burst IE included in the HARQ UL MAP IE in step 331. Thereafter, the MS 350 determines in step 333 whether a decoding end time of the HARQ UL MAP IE, i.e. an end of the HARQ UL MAP IE, has arrived. If it is determined that the end of the HARQ UL MAP IE has arrived, the MS 350 determines in step 335 whether an end time of the HARQ UL MAP IE, i.e., an end of the UL MAP message, has arrived. If it is determined that the end of the UL MAP message has arrived, the MS 350 ends decoding of the UL MAP message. The HARQ UL MAP IE decoding operation described in connection with FIG. 3 repeatedly performs the loop as many times as the size indicated by the 8-bit Length parameter shown under an Extended-2 DIUC parameter of the HARQ UL MAP IE. It should be noted herein that the 8-bit Length parameter shown in Table 7A under the Extended-2 DIUC parameter is different from the newly proposed Length parameter shown in Table 7B under the Duration parameter.

As described in FIG. 3, the MS 350 skips the sub-burst IEs including information on its insupportable modes without decoding the sub-burst IEs according to the Length parameter, and decodes only the sub-burst IE including information on its supportable mode, thereby minimizing the required decoding time.

As can be understood from the foregoing description, the communication system according to the present invention allows the MS to decode only the sub-burst IE for the mode supported by the MS thereby minimizing the time required for decoding MAP messages, i.e. a DL MAP message and a UL MAP message. The reduction in the decoding time contributes to improvement of MS performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving DownLink (DL) resource allocation information by a mobile station in a communication system, the method comprising:

receiving, from a base station, a Hybrid Automatic Repeat reQuest (HARQ) DL MAP message defining one or more data regions and including a sub-burst Information Element (IE) and length information of the sub-burst IE separate from the sub-burst IE, the sub-burst IE indicating DL resource allocation of at least one sub-burst of a data region corresponding to one of HARQ modes supported by the base station; and if the mobile station does not support the one of the HARQ modes, skipping, by the mobile station, decoding of at least a portion of the sub-burst IE based on the length information, wherein the sub-burst IE includes an ACK channel parameter indicating a number of ACK channels allocated to one or more mobile stations that will receive one or more HARQ ACK enabled DL bursts in the one or more data regions, and wherein the method further comprises:

decoding the ACK channel parameter;

determining the ACK channels used for the one or more HARQ ACK enabled DL bursts, based on the decoded ACK channel parameter; and accumulatively storing a value of the ACK channel parameter, before skipping decoding of the at least the portion of the sub-burst IE based on the length information.

2. The method of claim 1, further comprising:

if the mobile station supports the one of the HARQ modes, decoding the sub-burst IE corresponding to the one of the HARQ modes; and if there is an HARQ ACK enabled DL burst that the mobile station will receive, adding up accumulatively stored values of the ACK channel parameter and an order of the HARQ ACK enabled DL burst allocated to the mobile station in the one of the HARQ modes, and detecting a position of an ACK channel allocated to the mobile station depending on a result of the adding up.

3. A system for transmitting and receiving DownLink (DL) resource allocation information in a communication system, the system comprising:

a base station for generating a sub-burst Information Element (IE) indicating DL resource allocation of at least one sub-burst of a data region corresponding to one of Hybrid Automatic Repeat reQuest (HARQ) modes supported by the base station, generating length information of the sub-burst IE, and transmitting a HARQ DL MAP message to one or more mobile stations, wherein the HARQ DL MAP message defines one or more data regions, and includes the sub-burst IE and the length information of the sub-burst IE separate from the sub-burst IE; and a mobile station for receiving the HARQ DL MAP message, wherein the mobile station skips decoding of at least a portion of the sub-burst IE based on the length information, if the mobile station does not support the one of the HARQ modes, wherein the sub-burst IE includes ACK channel parameter indicating a number of ACK channels allocated to the one or more mobile stations that will receive one or more HARQ ACK enabled DL bursts in the one or more data regions, and wherein the mobile station decodes the ACK channel parameter, determines the ACK channels used for one or more HARQ ACK enabled DL bursts, based on the decoded ACK channel parameter, and accumulatively stores a value of the ACK channel parameter, before skipping the decoding of the at least the portion of the sub-burst IE based on the length information.

4. The system of claim 3, wherein the mobile station decodes the sub-burst IE corresponding to the one of the HARQ modes, if the mobile station supports the one of the HARQ modes, and wherein, if there is an HARQ ACK enabled DL burst that the mobile station will receive, the mobile station adds tip accumulatively stored values of the ACK channel parameter and an order of the HARQ ACK enabled DL burst allocated to the mobile station in the one of the HARQ modes, and detects a position of an ACK channel allocated to the mobile station, based on a result of the adding up.

* * * * *